United States Patent
Zhang et al.

(10) Patent No.: US 10,009,326 B2
(45) Date of Patent: *Jun. 26, 2018

(54) METHOD AND DEVICE FOR GENERATING ACCESS STRATUM KEY IN COMMUNICATIONS SYSTEM

(71) Applicant: HUAWEI TECHNOLOGIES CO., LTD., Shenzhen, Guangdong (CN)

(72) Inventors: Dongmei Zhang, Shenzhen (CN); Jing Chen, Shanghai (CN); Yang Cui, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/644,196

(22) Filed: Jul. 7, 2017

(65) Prior Publication Data

US 2017/0310649 A1    Oct. 26, 2017

Related U.S. Application Data

(63) Continuation of application No. 14/304,073, filed on Jun. 13, 2014, now Pat. No. 9,736,125, which is a
(Continued)

(30) Foreign Application Priority Data

Dec. 15, 2011    (CN) .......................... 2011 1 0421275

(51) Int. Cl.
*H04L 9/08*      (2006.01)
*H04L 29/06*    (2006.01)
(Continued)

(52) U.S. Cl.
CPC ......... *H04L 63/0485* (2013.01); *H04W 12/04* (2013.01); *H04W 88/06* (2013.01);
(Continued)

(58) Field of Classification Search
CPC ........... H04L 9/08; H04L 9/14; H04L 9/0861
See application file for complete search history.

(56) References Cited

U.S. PATENT DOCUMENTS

2007/0297367 A1    12/2007    Wang et al.
2011/0038480 A1    2/2011     Lin
(Continued)

FOREIGN PATENT DOCUMENTS

CN    101772100    7/2010
CN    101945384    1/2011
(Continued)

OTHER PUBLICATIONS

Office Action, dated Dec. 4, 2015, in U.S. Appl. No. 14/304,073 (6 pp.).
(Continued)

*Primary Examiner* — Izunna Okeke
(74) *Attorney, Agent, or Firm* — Staas & Halsey LLP

(57) ABSTRACT

In the communications system, a user equipment UE accesses a core network via a first network-side device by using a first air interface and connects to the first network-side device via a second network-side device by using a second air interface to access the core network. The method includes: acquiring, by the network-side device, an input parameter; calculating, by the network-side device, an access stratum root key KeNB* according to the input parameter and an access stratum root key KeNB on the first air interface, or using, by the network-side device, the KeNB as the KeNB*; and generating, by the second network-side device, an access stratum key on the second air interface according to the KeNB*, or sending, by the first network-side device, the KeNB* to the second network-side device.

20 Claims, 10 Drawing Sheets

Related U.S. Application Data continuation of application No. PCT/CN2012/086580, filed on Dec. 13, 2012.

(51) Int. Cl.
| | | |
|---|---|---|
| *H04W 12/04* | (2009.01) | |
| *H04W 88/06* | (2009.01) | |
| *H04W 88/10* | (2009.01) | |
| *H04W 76/02* | (2009.01) | |
| *H04W 76/15* | (2018.01) | |

(52) U.S. Cl.
CPC ....... *H04W 88/10* (2013.01); *H04L 2463/061* (2013.01); *H04W 76/025* (2013.01); *H04W 76/15* (2018.02)

(56) References Cited

U.S. PATENT DOCUMENTS

| | | | |
|---|---|---|---|
| 2011/0235802 A1 | 9/2011 | Kokkinen et al. | |
| 2012/0082315 A1 | 4/2012 | Bai et al. | |
| 2012/0129499 A1 | 5/2012 | Li | |
| 2012/0213372 A1* | 8/2012 | Zhang | H04W 12/04 380/278 |

FOREIGN PATENT DOCUMENTS

| | | |
|---|---|---|
| CN | 101945387 | 1/2011 |
| CN | 102056157 | 5/2011 |
| CN | 102056159 | 5/2011 |
| CN | 102158860 | 8/2011 |
| EP | 2487947 | 8/2012 |

OTHER PUBLICATIONS

Office Action, dated May 24, 2016, in U.S. Appl. No. 14/304,073 (9 pp.).
Notice of Allowance, dated Apr. 10, 2017, in U.S. Appl. No. 14/304,073 (8 pp.).
International Search Report, dated Mar. 7, 2013, in International Application No. PCT/CN2012/086580 (4 pp.).
Written Opinion of the International Searching Authority, dated Mar. 7, 2013, in International Application No. PCT/CN2012/086580 (7 pp.).
Extended European Search Report, dated Nov. 17, 2014, in European Application No. 12858204.6 (6 pp.).
Search Report, dated Jan. 27, 2015, in Chinese Application No. 201110421275.9 (2 pp.).
Office Action, dated Feb. 2, 2015, in Chinese Application No. 201110421275.9 (3 pp.).
Zhang, L. et al., *Security Mechanism LTE System*, Apr. 2010 (6 pp.).
*3rd Generation Partnership Project; Technical Specification Group Services and System Aspects; 3GPP System Architecture Evolution (SAE); Security architecture (Release 11)*, 3GPP TS 33.401 V11.1.0 (Sep. 2011), pp. 1-123.
U.S. Appl. No. 14/304,073, filed Jun. 13, 2014, Zhang et al., Huawei Technologies Co., Ltd.

* cited by examiner

METHOD AND DEVICE FOR GENERATING ACCESS STRATUM KEY IN COMMUNICATIONS SYSTEM

CROSS-REFERENCE TO RELATED APPLICATIONS

This application is a continuation of U.S. patent application Ser. No. 14/304,073, filed on Jun. 13, 2014, which is a continuation of International Application No. PCT/CN2012/086580, filed on Dec. 13, 2012. The International Application claims priority to Chinese Patent Application No. 201110421275.9, filed on Dec. 15, 2011. All of the aforementioned patent applications are hereby incorporated by reference in their entireties.

TECHNICAL FIELD

The present invention relates to the radio communication field, and more particularly, to a method and a device thereof for generating an access stratum key in a communications system.

BACKGROUND

In a newly proposed LTE-Hi (Long Term Evolution-Hi, Long Term Evolution-Hi) architecture, a user equipment (User Equipment, UE) may access a core network via an evolved NodeB (evolved NodeB, eNB), or may connect to the eNB via an LTE-Hi access point (LTE-Hi Access Point, LTE-Hi AP) and then access the core network via the eNB. The UE may also directly connect to a gateway device on another network via the LTE-Hi AP. In the LTE-Hi architecture, the UE has two radio air interfaces, that is, a Uu air interface between the UE and the eNB and a Uu' air interface between the UE and the LTE-Hi AP.

The LTE-Hi architecture not only can support the scenario in which the UE performs access initially from the LTE-Hi AP and then some services are transferred to the eNB, but also can support the scenario in which the UE performs access initially from the eNB and then some services are transferred to the LTE-Hi AP. Therefore, an air interface security mechanism for the Uu' air interface needs to be compatible with the foregoing two scenarios. The UE may receive data through two links corresponding to the Uu' air interface and the Uu air interface at the same time to communicate with the LTE-Hi AP and the eNB at the same time. In such a scenario, two branches have their own air interfaces. Generation, maintenance, modification and deletion of an access stratum (Access Stratum, AS) security context on the two air interfaces need to be considered to ensure security of data transmitted over each air interface.

However, in the prior art, only a manner of generating an AS key on the Uu air interface is provided, while how to generate the AS key on the Uu' air interface is not involved. As a result, security of data transmission over the Uu' air interface cannot be ensured.

SUMMARY

The present invention provides a method and a device thereof for generating an access stratum key in a communications system, which solves a problem in the prior art where security of data transmission over two air interfaces of a UE cannot be ensured at the same time and allows the UE to perform secure data transmission over the two air interfaces, thereby improving system security.

According to one aspect, the present invention provides a method for generating an access stratum key in a communications system. In the communications system, a user equipment UE accesses a core network via a first network-side device by using a first air interface and connects to the first network-side device via a second network-side device by using a second air interface to access the core network. The method includes: acquiring, by the network-side device, an input parameter, where the input parameter includes a time-varying parameter and/or a parameter related to a serving cell of the second network-side device; calculating, by the network-side device, an access stratum root key KeNB* on the second air interface according to the input parameter and an access stratum root key KeNB on the first air interface, or using, by the network-side device, the KeNB as the access stratum root key KeNB* on the second air interface; and generating, by the second network-side device, an access stratum key on the second air interface according to the KeNB*, or sending, by the first network-side device, the KeNB* to the second network-side device so that the second network-side device generates the access stratum key on the second air interface according to the KeNB*.

According to another aspect, the present invention provides a method for generating an access stratum key in a communications system. In the communications system, a user equipment UE accesses a core network via a first network-side device by using a first air interface and connects to the first network-side device via a second network-side device by using a second air interface to access the core network. The method includes: acquiring, by the UE, an input parameter, where the input parameter includes a time-varying parameter and/or a parameter related to a serving cell of the second network-side device; calculating, by the UE, an access stratum root key KeNB* on the second air interface according to the input parameter and an access stratum root key KeNB on the first air interface, or using, by the UE, the KeNB as the access stratum root key KeNB* on the second air interface; and generating, by the UE, an access stratum key on the second air interface according to the KeNB*.

According to still another aspect, the present invention provides a network-side device in a communications system. In the communications system, a user equipment UE accesses a core network via a first network-side device by using a first air interface and connects to the first network-side device via a second network-side device by using a second air interface to access the core network. The network-side device includes: an acquiring module, configured to acquire an input parameter, where the input parameter includes a time-varying parameter and/or a parameter related to a serving cell of the second network-side device; a calculating module, configured to calculate an access stratum root key KeNB* on the second air interface according to the input parameter and an access stratum root key KeNB on the first air interface, or use the KeNB as the access stratum root key KeNB* on the second air interface; and a generating module, configured to generate an access stratum key on the second air interface according to the KeNB*, or a sending module, configured to send the KeNB* to the second network-side device so that the second network-side device generates the access stratum key on the second air interface according to the KeNB*.

According to still another aspect, the present invention provides a user equipment in a communications system. In the communications system, the user equipment UE accesses a core network via a first network-side device by using a first air interface and connects to the first network-side device via a second network-side device by using a second air interface to access the core network. The user equipment includes: an acquiring module, configured to acquire an input parameter, where the input parameter includes a time-varying parameter and/or a parameter related to a serving cell of the second network-side device; a calculating module, configured to calculate an access stratum root key KeNB* on the second air interface according to the input parameter and an access stratum root key KeNB on the first air interface, or use the KeNB as the access stratum root key KeNB* on the second air interface; and a generating module, configured to generate an access stratum key on the second air interface according to the KeNB*.

Based on the foregoing technical solutions, the second network-side device may acquire the KeNB* that is acquired based on the KeNB on the first air interface, and the user equipment may calculate the KeNB* according to the KeNB known by itself. In this way, the second network-side device and the user equipment may have the same access stratum root key KeNB* on the second air interface. The second network-side device and the user equipment may generate the same access stratum key according to the same KeNB*, which may improve security of data transmission over the second air interface and ensure security of data transmitted between the second network-side device and the user equipment when the access stratum key is used for data transmission over the second air interface.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person skilled in the art based on the embodiments of the present invention without creative efforts shall fall within the protection scope of the present invention.

Firstly, a method 100 for generating an access stratum key in a communications system according to an embodiment of the present invention is described with reference to FIG. 1. In the communications system, a UE accesses a core network via a base station by using a first air interface and connects to the base station via an access device by using a second air interface to access the core network. Therefore, the communications system that the method 100 applies to is a system supporting data offloading transmission, and the UE may connect to the base station by using the two air interfaces at the same time. Such a communications system may include but is not limited to: an LTE-Hi architecture, an LTE-WiFi architecture, a WCDMA-WiFi architecture, and the like.

Figure 1:
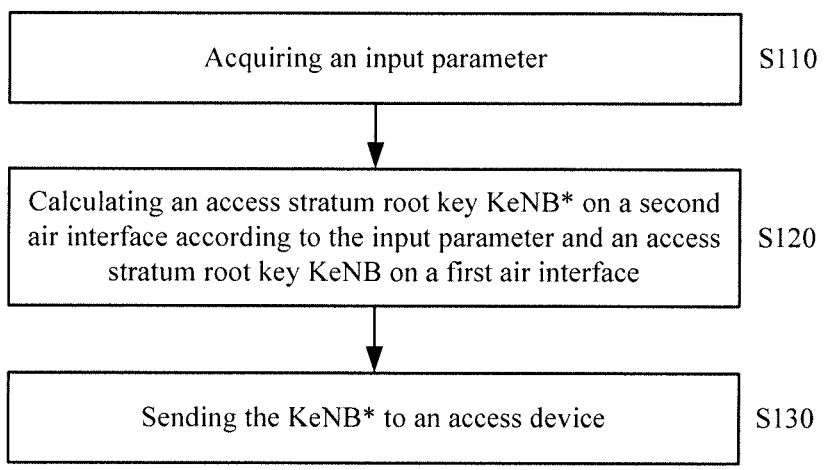
FIG. 1 is a flowchart of a method for generating an access stratum key performed by a base station according to an embodiment of the present invention.

As shown in FIG. 1, the method 100 includes:

in S110, acquiring an input parameter, where the input parameter includes a time-varying parameter and/or a parameter related to a serving cell of the access device;

in S120, calculating an access stratum root key KeNB* on the second air interface according to the input parameter and an access stratum root key KeNB on the first air interface, where the KeNB* is also calculated by the UE according to the input parameter and the KeNB; and in S130, sending the KeNB* to the access device so that the access device generates an access stratum key on the second air interface according to the KeNB*, where the access stratum key on the second air interface is also generated by the UE according to the KeNB*.

The method 100 is performed by the base station. According to the prior art, the base station and the UE may save the KeNB on the first air interface. In this embodiment of the present invention, the access device connected to the second air interface and the UE need to have the same KeNB*, where the KeNB* is used as a root key for deriving the AS key on the second air interface so that the access device and the UE may generate the same AS key on the second air interface. It should be noted that, in this specification, the base station may also be called a first network-side device and the access device may also be called a second network-side device.

The base station may acquire the KeNB* by using the input parameter and the KeNB. The UE may also acquire the KeNB* by using the input parameter and the KeNB. When the base station sends the KeNB* to the access device connected to the second air interface, the UE and the access device connected to the second air interface have the same KeNB* so as to generate, based on the same root key, the AS key on the second air interface.

The input parameter required for generating the KeNB* may include the time-varying parameter and/or the parameter related to the serving cell of the access device. In this way, different embodiments may have different manners for flexibly calculating the KeNB*. The time-varying parameter is a parameter varying along the time, may be a value of a specific counter, may be a random number generated randomly, or may be another parameter that a person skilled in the art may think of and that uses the time as an argument. The parameter related to the serving cell of the access device may include but is not limited to a cell identifier of the serving cell of the access device and/or a central frequency of the serving cell of the access device. The parameter related to the serving cell of the access device may also be another physical parameter that a person skilled in the art may think of and the serving cell of the access device has.

According to one embodiment of the present invention, when the input parameter includes the time-varying parameter, the time-varying parameter may include a PDCP (Packet Data Convergence Protocol, Packet Data Convergence Protocol) COUNT (count) value of a bearer of the UE on the first air interface. The PDCP COUNT value is a count value that already exists in the prior art. The count value progressively increases with sending and receiving of a data packet on a corresponding bearer. In this way, the base station and the UE may conveniently acquire the time-varying parameter by specifying the PDCP COUNT value of a bearer on the base station and the UE instead of by exchanging a message, which may save network resources.

For example, the PDCP COUNT value may be a PDCP COUNT value of a bearer corresponding to a configuration message. According to one embodiment of the present invention, the configuration message may be a configuration message used for the base station to configure the second air interface. Only a few configuration messages used for the base station to configure the second air interface are sent. Therefore, such a case occurs difficultly that the PDCP COUNT value of the bearer corresponding to the configuration message is re-counted because the count value reaches the maximum value so that the PDCP COUNT value used for calculating the KeNB* is different each time, thereby helping ensure that the KeNB* calculated for the UE is different. In other embodiments, the configuration message may also be a configuration message used for the base station to configure another air interface or channel. In addition, the PDCP COUNT value may also be a PDCP COUNT value of a bearer corresponding to a service of the UE on the first air interface, for example, a file download service and the like.

According to one embodiment of the present invention, when the input parameter includes the time-varying parameter, the time-varying parameter may include a random number generated by the base station. In this case, the base station acquires the input parameter according to the random number generated by itself. To enable the UE to also acquire the input parameter, the base station needs to send the random number generated by itself to the UE. For example, the base station may send the configuration message used for configuring the second air interface to the UE, where the configuration message carries the random number generated by the base station. In this way, carrying the random number in the configuration message may prevent an increase in network overhead due to use of a new message to transmit the random number and ensure that transmission of the random number does not affect an existing message sending sequence. The UE and the base station may generate the same KeNB* by using the same input parameter.

According to one embodiment of the present invention, when the input parameter includes the time-varying parameter, the time-varying parameter may include a random number generated by the UE. In this case, the UE acquires the input parameter according to the random number generated by itself. To enable the base station to also acquire the input parameter, the UE needs to send the random number generated by itself to the base station. For example, the base station may receive, from the UE, a configuration completion message in response to the configuration message used for configuring the second air interface, where the configuration completion message carries the random number generated by the UE. In this way, carrying the random number in the configuration completion message may prevent an increase in network overhead due to use of a new message to transmit the random number and ensure that transmission of the random number does not affect the existing message sending sequence.

According to one embodiment of the present invention, when the input parameter includes the time-varying parameter, the time-varying parameter may include a first random number generated by the base station and a second random number generated by the UE. To enable the base station and the UE to have the same input parameter for generating the same KeNB*, the base station needs to send the first random number to the UE, for example, by using the configuration message used for configuring the second air interface, and the UE needs to send the second random number to the base station, for example, by using the configuration completion message in response to the configuration message. Generation of the KeNB* by using the random numbers separately generated by the base station and the UE has higher security than generation of the KeNB* by using only the random number generated by the base station or the UE.

According to one embodiment of the present invention, when the input parameter includes the parameter related to the serving cell of the access device, the parameter related to the serving cell of the access device may include at least one of the following items: the cell identifier of the serving cell of the access device and the central frequency of the serving cell of the access device. Use of relevant parameters of different cells helps ensure that the derived KeNB* is different for different cells.

After calculating the KeNB*, the base station sends it to the access device. In this way, the access device and the UE may further derive the access stratum key on the second air interface according to the same root key KeNB*, thereby introducing the access stratum key on the second air interface to help perform secure transmission. Therefore, when the access stratum key is used for data transmission over the second air interface, security of data transmission over the second air interface may be improved and security of data transmitted between the access device and the user equipment is ensured.

FIG. 1 describes the method 100 for generating an access stratum key on a base station side. The following describes a method 200 for generating an access stratum key on an access device side according to an embodiment of the present invention with reference to FIG. 2 and a method 300 for generating an access stratum key on a UE side according to an embodiment of the present invention with reference to FIG. 3. Both the method 200 and the method 300 correspond to the method 100. Therefore, for specific descriptions of the method 200 and the method 300, reference may be made to the corresponding parts of the method 100, and details are not described herein again to avoid repetition. Both the method 200 and the method 300 apply to the following communications system: a UE accesses a core network via a base station by using a first air interface and connects to the base station via an access device by using a second air interface to access the core network.

Figure 2:
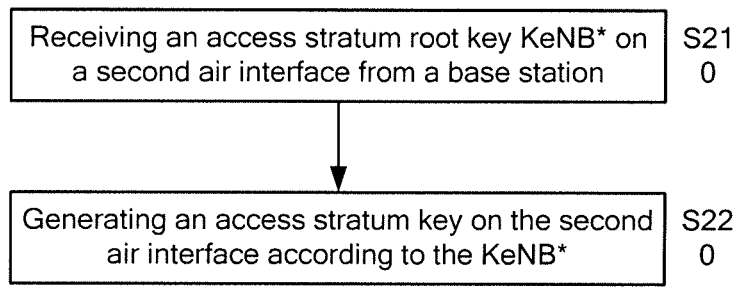
FIG. 2 is a flowchart of a method for generating an access stratum key performed by an access device according to an embodiment of the present invention.

As shown in FIG. 2, the method 200 includes:

in S210, receiving an access stratum root key KeNB* on the second air interface from the base station, where the KeNB* is calculated by the base station according to an acquired input parameter and an access stratum root key KeNB on the first air interface, the KeNB* is also calculated by the UE according to the input parameter and the KeNB, and the input parameter includes a time-varying parameter and/or a parameter related to a serving cell of the access device; and in S220, generating an access stratum key on the second air interface according to the KeNB*, where the access stratum key on the second air interface is also generated by the UE according to the KeNB*.

The method 200 is performed by the access device connected to the second air interface. The access device may have the same access stratum root key on the second air interface as the UE by acquiring the KeNB* from the base station, so that the access stratum key on the second air interface may be derived according to the same root key, thereby introducing the same key that helps perform secure transmission for the second air interface. Therefore, when the access stratum key is used for data transmission over the second air interface, security of data transmission over the second air interface may be improved and security of data transmitted between the access device and the user equipment is ensured.

Figure 3:
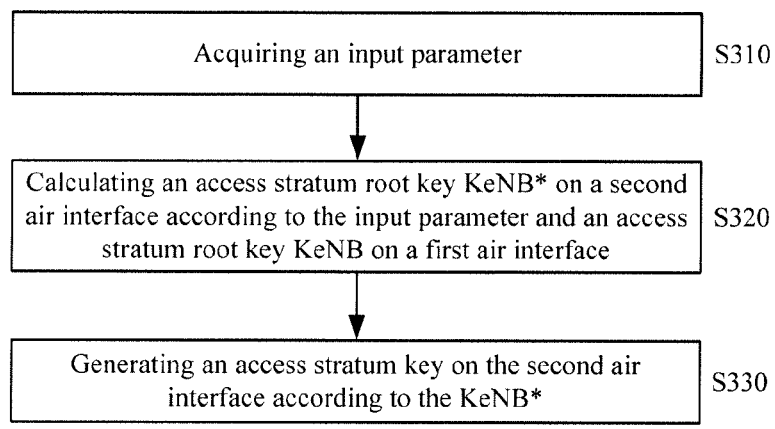
FIG. 3 is a flowchart of a method for generating an access stratum key performed by a user equipment according to an embodiment of the present invention.

As shown in FIG. 3, the method 300 includes:

in S310, acquiring an input parameter, where the input parameter includes a time-varying parameter and/or a parameter related to a serving cell of the access device;

in S320, calculating an access stratum root key KeNB* on the second air interface according to the input parameter and an access stratum root key KeNB on the first air interface, where the KeNB* is also calculated by the base station according to the input parameter and the KeNB and is sent to the access device; and in S330, generating an access stratum key on the second air interface according to the KeNB*, where the access stratum key on the second air interface is also generated by the access device according to the KeNB*.

The method 300 is performed by the user equipment. The user equipment may acquire the KeNB* by using the input parameter and the KeNB, and the access device may acquire the same KeNB* from the base station. In this way, the user equipment and the access device may derive the same access stratum key on the second air interface according to the same KeNB*, thereby introducing the same key for the second air interface to help perform secure data transmission.

According to one embodiment of the present invention, when the input parameter includes the time-varying parameter, the time-varying parameter may include a PDCP COUNT value of a bearer of the UE on the first air interface. In this way, the base station and the UE may conveniently acquire the time-varying parameter by specifying the PDCP COUNT value of a bearer to calculate the KeNB* instead of by exchanging a message, which may save network resources. For example, the PDCP COUNT value may be a PDCP COUNT value of a bearer corresponding to a configuration message used for the base station to configure the second air interface.

According to one embodiment of the present invention, when the input parameter includes the time-varying parameter, the time-varying parameter may include a random number generated by the base station. In this way, the UE needs to receive the random number from the base station to generate the same KeNB* as the base station. For example, the UE may receive the configuration message used for configuring the second air interface from the base station, where the configuration message carries the random number generated by the base station. In this way, carrying the random number in the configuration message may prevent an increase in network overhead due to use of a new message to transmit the random number and ensure that transmission of the random number does not affect an existing message sending sequence.

According to one embodiment of the present invention, when the input parameter includes the time-varying parameter, the time-varying parameter may include a random number generated by the UE. In this case, the UE needs to send the random number generated by itself to the base station so that the base station uses the same input parameter to generate the same KeNB* as the UE. For example, the UE may send a configuration completion message in response to the configuration message used for configuring the second air interface to the base station, where the configuration completion message carries the random number generated by the UE. In this way, carrying the random number in the configuration completion message may prevent an increase in network overhead due to use of a new message to transmit the random number and ensure that transmission of the random number does not affect the existing message sending sequence.

According to one embodiment of the present invention, when the input parameter includes the time-varying parameter, the time-varying parameter may include a first random number generated by the base station and a second random number generated by the UE. To enable the base station and the UE to have the same input parameter for generating the same KeNB*, the base station needs to send the first random number to the UE, for example, by using the configuration message used for configuring the second air interface, and the UE needs to send the second random number to the base station, for example, by using the configuration completion message in response to the configuration message. Generation of the KeNB* by using the random numbers separately generated by the base station and the UE has higher security than generation of the KeNB* by using only the random number generated by the base station or the UE.

According to one embodiment of the present invention, when the input parameter includes the parameter related to the serving cell of the access device, the parameter related to the serving cell of the access device may include at least one of the following items: a cell identifier of the serving cell of the access device and a central frequency of the serving cell of the access device. Use of relevant parameters of different cells helps ensure that the derived KeNB* is different for different cells.

According to the method for generating an access stratum key in this embodiment of the present invention, the user equipment and the access device may use the same root key KeNB* to generate the same access stratum key on the second air interface. Therefore, when the access stratum key is used for data transmission over the second air interface, security of data transmission over the second air interface may be improved and security of data transmitted between the access device and the user equipment is ensured.

Figure 4:
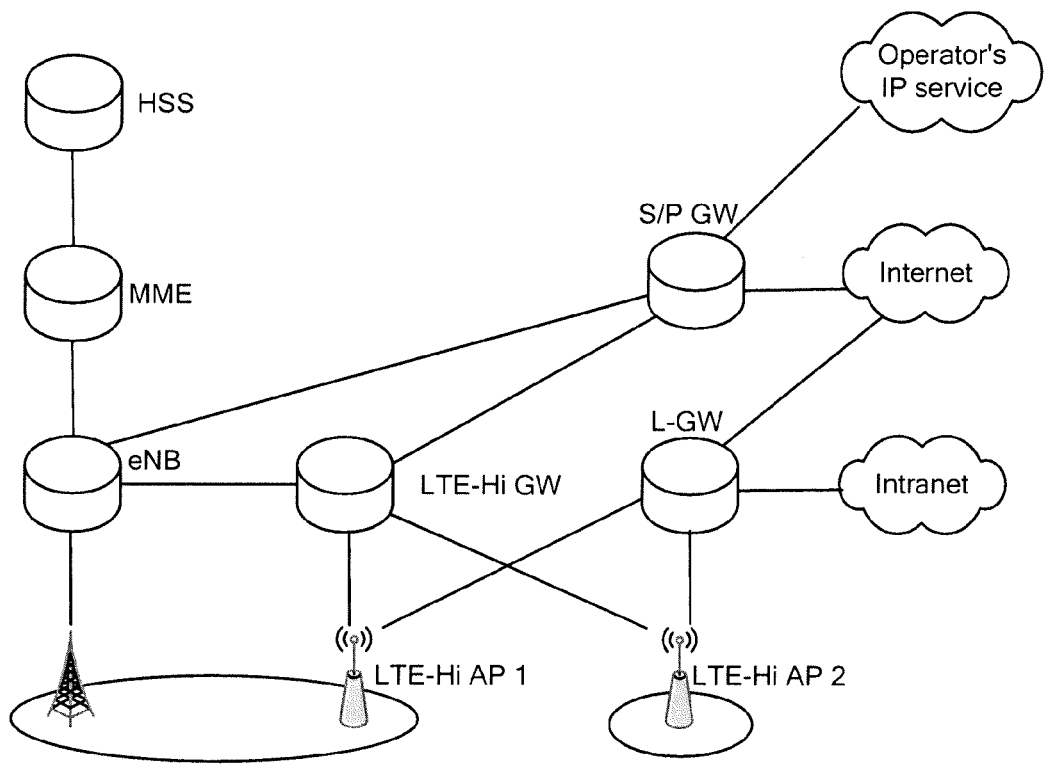
FIG. 4 is a schematic diagram of an example of an LTE-Hi architecture.

The following describes specific implementation of the method 100 to the method 300 with reference to specific examples. A first example and a second example are merely used to help understand the technical solutions provided by the present invention and do not pose any limitation on the protection scope of the present invention. Before the first example and the second example are described, an example of a communications system that a method for generating an access stratum key applies to is described with reference to FIG. 4. FIG. 4 illustrates an LTE-Hi architecture. In the architecture, a Uu air interface is the first air interface, a Uu' air interface is the second air interface, and an LTE-Hi AP as an access device of the Uu' air interface connects to an eNB to enable a UE to access a core network. The architecture also aims to help better understand the technical solutions provided by the present invention and does not pose any limitation on the protection scope of the present invention.

In the LTE-Hi architecture illustrated in FIG. 4, the UE may access the eNB by using the Uu air interface and then connect to an MME (Mobility Management Entity, mobility management entity). If the UE is located within a coverage area of a serving cell of an LTE-Hi AP 1, the UE may also access the LTE-Hi AP 1 by using the Uu' air interface, the LTE-Hi AP 1 is converged into an LTE-Hi GW (gateway, gateway) and the LTE-Hi GW connects to the eNB, so as to connect the UE to the MME. The LTE-Hi GW in FIG. 4 may converge signals of the LTE-Hi AP 1 and an LTE-Hi AP 2. S1 connections with various LTE-Hi APs may be converged by the LTE-Hi GW, thereby reducing the number of S1 connections and implementing Hi resource management and control.

In addition to connecting to an LTE core network by using the eNB and the LTE-Hi AP (including the LTE-Hi AP 1 or the LTE-Hi AP 2 in FIG. 4), the UE may also connect to an operator's IP service network and an Internet via an S/P GW by using the eNB and the LTE-Hi AP or connect to the Internet and an intranet via an L-GW by using the LTE-Hi AP.

Figure 5:
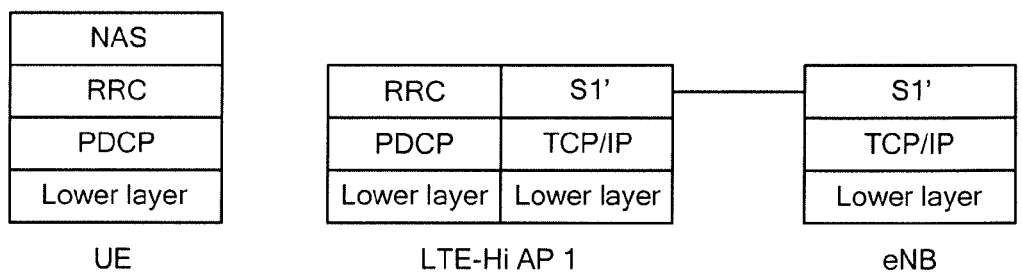
FIG. 5 is an example of a control plane protocol stack in the LTE-Hi architecture illustrated in FIG. 4.
Figure 6:
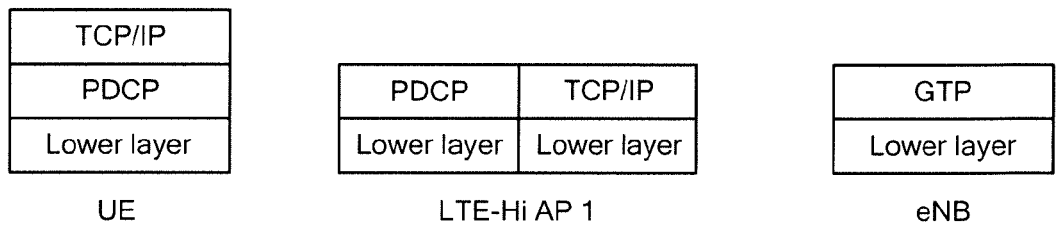
FIG. 6 is an example of a data link protocol stack in the LTE-Hi architecture illustrated in FIG. 4.

In the LTE-Hi architecture illustrated in FIG. 4, the UE connected to the eNB and the LTE-Hi AP 1, the LTE-Hi AP 1, and the eNB may have a control plane protocol stack illustrated in FIG. 5. The LTE-Hi AP 1 accesses the eNB by using an enhanced S1 interface, that is, an S1' interface. In addition, the UE, the LTE-Hi AP 1, and the eNB may have a data plane protocol stack illustrated in FIG. 6. Protocols illustrated in the protocol stack are the same as those in the prior art and are not described herein again. According to an illustrated protocol stack example, the UE may access the core network via the eNB by using the first air interface Uu air interface and connect to the eNB via the LTE-Hi AP 1 by using the second air interface Uu' air interface to access the core network.

In the LTE-Hi architecture illustrated in FIG. 4, an access stratum key may be generated between the UE and the LTE-Hi AP 1 by using the foregoing method, so that secure data transmission may be performed between the UE and the LTE-Hi AP 1. For brief descriptions, the LTE-Hi AP 1 that the UE connects to is called an LTE-Hi node for short in the following first and second examples. In addition, a third example and a fourth example in the following are also described based on the LTE-Hi architecture in FIG. 4, and the LTE-Hi AP 1 that the UE connects to is also called the LTE-Hi node for short.

First Example

A UE accesses a network by using an eNB. For an offloading need, the eNB establishes a Hi branch for a Uu' air interface. The Hi branch refers to a radio link between the UE and an LTE-Hi node.

The eNB configures the Uu' air interface for the UE by using a connection reconfiguration method. The UE sets up an RRC (Radio Resource Connection, radio resource connection) with the LTE-Hi node according to a configuration message and then locally derives a KeNB* used as an access stratum root key on the Uu' air interface. The eNB may derive the KeNB* according to the same logic and send the derived KeNB* to the LTE-Hi node.

As service volume changes, the eNB may release the Hi branch used for offloading. When the Hi branch is subsequently re-added for offloading, multiple access stratum root keys derivderived by the eNB during establishment of the Hi branch need to be different. Therefore, a key derivation input of the Hi branch may include a time-varying parameter. The time-varying parameter may be a PDCP COUNT value of a bearer, which is synchronized by the eNB and UE, for example, the PDCP COUNT value of a bearer for sending RRC signaling, or may be another time-varying parameter calculated based on the PDCP COUNT value.

In the UE and the eNB, the following expression may be used to calculate the KeNB*:

$$KeNB^* = KDF(KeNB, PCI, DL\ EARFCN, PDCP\ COUNT)$$

where, the KDF is a key generation function; the KeNB is an access stratum root key on a Uu air interface or a key acquired according to this root key; the PDCP COUNT value may be a PDCP COUNT value corresponding to the bearer involved in the configuration message for configuring the Hi branch; the PCI (Physical Cell Identity, physical cell identity) is a cell identifier of an LTE-Hi cell covered by the LTE-Hi node; the DL EARFCN (DownLink E-UTRA Absolute Radio Frequency Channel Number, downlink E-UTRA absolute radio frequency channel number) indicates a central frequency of the LTE-Hi cell. This expression is merely an example and does not pose any limitation on how to acquire the KeNB*.

After acquiring the KeNB*, the LTE-Hi node may activate access stratum security protection on the Uu' air interface by means of an AS SMC (Access Stratum Security Mode Command, access stratum security mode command) process. The activation process may be the same as a process of activating access stratum security protection on the Uu air interface in the prior art except that a parameter involved in the process is a parameter on the Uu' air interface instead of a parameter on the Uu air interface. In addition, a manner of deriving a cipher key or an integrity protection key on the Uu' air interface is the same as a manner of deriving a cipher key and an integrity protection key of an LTE access stratum, and is not described herein again.

Second Example

Figure 7:
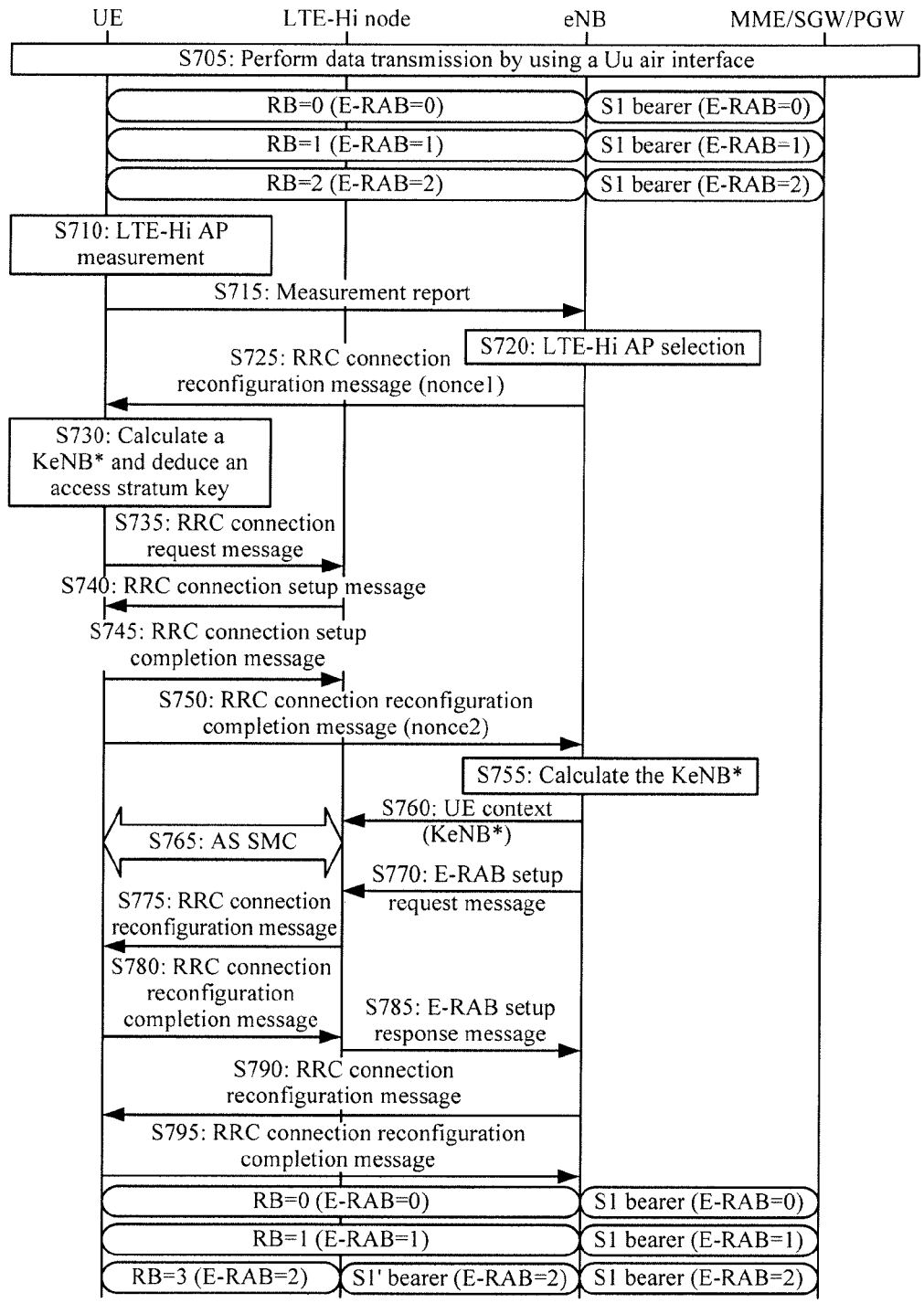
FIG. 7 is a second example of generating an access stratum key between a UE and an LTE-Hi AP in an LTE-Hi architecture.

A difference between the second example illustrated in FIG. 7 and the first example mainly lies in a KeNB* acquisition manner. A KeNB* is calculated according to a random number in the second example but is calculated according to the PDCP COUNT value in the first example.

In the second example, the random number is introduced to distinguish different keys derivderived by an eNB at different time:

$$KeNB^* = KDF(KeNB, PCI, DL\ EARFCN, nonce1, nonce2)$$

where, the KeNB* is an access stratum root key on a Uu' air interface; the KDF is a key generation function; the KeNB is an access stratum root key on a Uu air interface; the PCI is a cell identifier of an LTE-Hi cell covered by an LTE-Hi node; the DL EARFCN indicates a central frequency of the LTE-Hi cell; the nonce1 is a random number generated by the eNB; the nonce2 is a random number generated by a UE. It should be noted that, although both the nonce1 and the nonce2 are used in the foregoing KeNB* derivation manner, the nonce1 or the nonce2 may be used independently as long as the random number is used when the KeNB* is derived. When both the nonce1 and the nonce2 are used to derive the KeNB*, better security may be provided. In addition, this expression is merely an example and does not pose any limitation on how to acquire the KeNB*. For example, when the KeNB* is derived, only the PCI or the DL EARFCN may be used, or neither of them is used.

In S705, the UE performs data transmission with the eNB by using the Uu air interface. Data communicated between the UE and a core network, a packet network or the like is forwarded between the eNB and an MME/SGW (Serving Gateway, serving gateway)/PGW (Packet Data Network Gateway, packet data network gateway).

As shown in FIG. 7, three data channels are set up between the UE and the MME/SGW/PGW, that is, E-RAB (E-UTRAN Radio Access Bearer, E-UTRAN radio access bearer)=0, E-RAB=1, and E-RAB=2. E-RAB=0 includes radio bearer (Radio Bearer, RB)=0 between the UE and the eNB and an S1 bearer between the eNB and the MME/SGW/PGW; E-RAB=1 includes RB=1 between the UE and the eNB and the S1 bearer between the eNB and the MME/SGW/PGW; E-RAB=2 includes RB=2 between the UE and the eNB and the S1 bearer between the eNB and the MME/SGW/PGW.

In S710, the UE performs LTE-Hi AP measurement.

In S715, the UE sends a measurement report to the eNB, where the measurement report contains a CGI (Cell Global Identity, cell global identity) list found by the UE for LTE-Hi APs.

In S720, the eNB selects, according to the measurement report, an LTE-Hi AP from LTE-Hi APs reported by the UE to serve the eNB. In this example, assume that the eNB selects the LTE-Hi AP 1 in the architecture illustrated in FIG. 4, which is called the LTE-Hi node for short.

In S725, the eNB sends an RRC connection reconfiguration (RRCConnectionReconfiguration) message to the UE, where the message carries the CGI of the LTE-Hi AP selected by the eNB. If the random number nonce1 generated by the eNB needs to be used to derivderive the KeNB*, the nonce1 is also carried in the RRC connection reconfiguration message.

In S730, the UE calculates the KeNB* and derivderives an access stratum key on the Uu' air interface according to the KeNB*. As described in the expression in the second example, the KeNB* may be calculated by using the nonce1, by using the nonce2, or by using both the nonce1 and the nonce2. When the nonce2 needs to be used for calculation of the KeNB*, the UE generates the random number nonce2 randomly.

In S735, the UE sends an RRC connection request (RRCConnectionRequest) message to the LTE-Hi node according to the LTE-Hi node selected by the eNB.

In S740, the LTE-Hi node sends an RRC connection setup (RRCConnectionSetup) message to the UE.

In S745, the UE sends an RRC connection setup completion (RRCConnectionSetupComplete) message to the LTE-Hi node.

In S750, the UE accesses the LTE-Hi cell served by the LTE-Hi node and sends an RRC connection reconfiguration completion (RRCConnectionReconfigurationComlpete) message to the eNB. When the nonce2 needs to be used to derivderive the KeNB*, in addition to a C-RNTI (Cell-Radio Network Temporary Identifier, cell-radio network temporary identifier) allocated by the LTE-Hi node which needs to be carried by this message in the prior art, this message also needs to carry the nonce2.

In S755, the eNB calculates the KeNB*. When the nonce2 randomly generated by the UE needs to be used for calculation of the KeNB*, the eNB needs to calculate the KeNB* after receiving the nonce2 in S750. When only the nonce1 instead of the nonce2 is required for the calculation of the KeNB*, the eNB may also calculate the KeNB* after the nonce1 is generated.

In S760, the eNB sends a UE context to the LTE-Hi node, where the UE context needs to include the KeNB* and a UE security capability. The KeNB* is used by the LTE-Hi node to derivderive the access stratum key and the UE security capability is used by the LTE-Hi node to perform AS SMC negotiation with the UE.

In S765, the LTE-Hi node triggers an AS SMC process to negotiate a Uu' security algorithm with the UE and activates AS security protection. The AS SMC process performed by the LTE-Hi node and the UE may be the same as an AS SMC process performed on the Uu air interface in the prior art and is not described herein again. After that, integrity and ciphering protection may be performed on all messages on the Uu' air interface according to Krrcint and Krrcenc derivderived from the KeNB*, and ciphering protection may be performed for user plane data according to Kupenc. A method for derivderiving an integrity protection key and a cipher key of RRC signaling, and a cipher key of the user plane data is the same as a method for derivderiving an LTE AS key.

In S770, the eNB sends an E-RAB setup request message to the LTE-Hi node, where the message carries an E-RAB list to be set and the C-RNTI of the UE. Assume that E-RAB=2 is to be set.

In S775, the LTE-Hi node sends the RRC connection reconfiguration message to the UE, where the message carries E-RAB=2 and RB=3.

In S780, the UE returns the RRC connection reconfiguration completion message to the LTE-Hi node.

In S785, the LTE-Hi node returns an E-RAB setup response message to the eNB, where the message carries an E-RAB setup list including RB=3.

In S790, the eNB sends the RRC connection reconfiguration message to the UE, requesting the UE to release RB=2.

In S795, the UE returns the RRC connection reconfiguration completion message to the eNB.

In this way, the three data channels E-RAB=0, E-RAB=1 and E-RAB=2 are set up between the UE and the MME/SGW/PGW upon configuration of the Hi branch by the eNB. E-RAB=0 and E-RAB=1 are the same as initial E-RAB=0 and E-RAB=1. E-RAB=2 after reconfiguration includes RB=3 between the UE and the LTE-Hi node, an S1' bearer between the LTE-Hi node and the eNB, and the S1 bearer between the eNB and the MME/SGW/PGW.

Figures 8, 9:
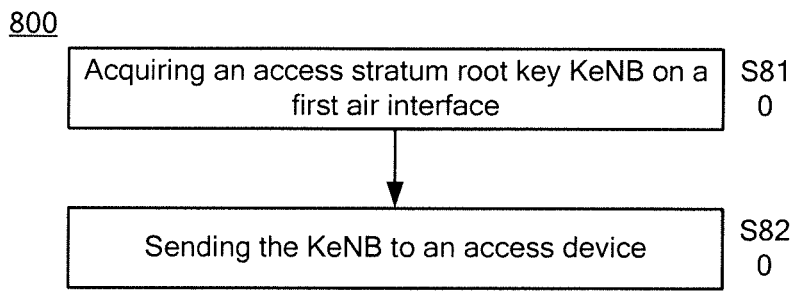
FIG. 8 is a flowchart of another method for generating an access stratum key performed by a base station according to an embodiment of the present invention.
FIG. 9 is a flowchart of another method for generating an access stratum key performed by an access device according to an embodiment of the present invention.

The following describes another method 800 for generating an access stratum key in a communications system according to an embodiment of the present invention with reference to FIG. 8. In the communications system, a UE accesses a core network via a base station by using a first air interface and connects to the base station via an access device by using a second air interface to access the core network. Therefore, the communications system that the method 800 applies to is a system supporting data offloading transmission, and the UE may connect to the base station by using the two air interfaces at the same time. Such a communications system may include but is not limited to: an LTE-Hi architecture, an LTE-WiFi architecture, a WCDMA-WiFi architecture, and the like.

As shown in FIG. 8, the method 800 includes:

in S810, acquiring an access stratum root key KeNB on the first air interface; and in S820, sending the KeNB to the access device so that the access device calculates an access stratum root key KeNB* on the second air interface according to an acquired input parameter and the KeNB and generates an access stratum key on the second air interface according to the KeNB*, where the KeNB* is also calculated by the UE according to the input parameter and the KeNB, the access stratum key on the second air interface is also generated by the UE according to the KeNB*, and the input parameter includes a time-varying parameter and/or a parameter related to a serving cell of the access device.

The method 800 is performed by the base station. According to the prior art, the base station and the UE save the KeNB on the first air interface. In this embodiment of the present invention, the base station sends the saved KeNB to the access device. In this way, the access device may generate the KeNB* according to the input parameter and the KeNB. The UE also has the same input parameter and therefore the UE may also generate the KeNB* according to the KeNB saved in the UE. In this way, the access device and the UE may derivderive the same access stratum key on the second air interface according to the same root key KeNB*.

As a result, the access stratum key may be introduced on the second air interface to help perform secure transmission. Therefore, when the access stratum key is used for data transmission over the second air interface, security of data transmission over the second air interface may be improved and security of data transmitted between the access device and the user equipment is ensured.

FIG. 8 describes the method 800 for generating an access stratum key on a base station side. The following describes a method 900 for generating an access stratum key on an access device side according to an embodiment of the present invention with reference to FIG. 9 and a method 1000 for generating an access stratum key on a UE side according to an embodiment of the present invention with reference to FIG. 10. Both the method 900 and the method 1000 correspond to the method 800. Therefore, for specific descriptions of the method 900 and the method 1000, reference may be made to the corresponding parts of the method 800, and details are not described herein again to avoid repetition. Both the method 900 and the method 1000 apply to the following communications system: a UE accesses a core network via a base station by using a first air interface and connects to the base station via an access device by using a second air interface to access the core network.

As shown in FIG. 9, the method 900 includes:

in S910, acquiring an input parameter, where the input parameter includes a time-varying parameter and/or a parameter related to a serving cell of the access device;

in S920, receiving an access stratum root key KeNB on the first air interface from the base station;

in S930, calculating an access stratum root key KeNB* on the second air interface according to the input parameter and the KeNB, where the KeNB* is also calculated by the UE according to the input parameter and the KeNB; and in S940, generating an access stratum key on the second air interface according to the KeNB*, where the access stratum key on the second air interface is also generated by the UE according to the KeNB*.

The method 900 is performed by the access device. The access device may generate the access stratum root key KeNB* on the second air interface by using the acquired input parameter and the KeNB received from the base station. The UE may also generate the same KeNB* by using the acquired input parameter and the KeNB saved in the UE. In this way, both the access device and the UE may have the same root key KeNB* and may derivderive the same access stratum key on the second air interface by using the KeNB*, thereby enhancing security of data transmission over the second air interface.

Although S910 is performed before S920 in the method 900, S910 may also be performed after S920 or may be performed simultaneously with S920 as long as they are performed before S930.

According to one embodiment of the present invention, when the input parameter includes the time-varying parameter, the time-varying parameter may include a random number generated by the access device. In this case, the access device acquires the input parameter according to the random number generated by itself. To enable the UE to also acquire the input parameter, the access device needs to send the random number generated by itself to the UE. For example, the access device may send a security mode command message to the UE, where the security mode command message carries the random number generated by the access device. In this way, carrying the random number in the security mode command message may prevent an increase in network overhead due to use of a new message to transmit the random number and ensure that transmission of the random number does not affect an existing message sending sequence. The UE and the access device may generate the same KeNB* by using the same input parameter and the KeNB.

According to one embodiment of the present invention, when the input parameter includes the time-varying parameter, the time-varying parameter may include a random number generated by the UE. In this case, the UE acquires the input parameter according to the random number generated by itself. To enable the access device to also acquire the input parameter, the UE needs to send the random number generated by itself to the access device. For example, the access device may receive a setup completion message used to indicate that a radio link is successfully set up on the second air interface from the UE, where the setup completion message carries the random number generated by the UE. In this way, carrying the random number in the setup completion message may prevent an increase in network overhead due to use of a new message to transmit the random number and ensure that transmission of the random number does not affect the existing message sending sequence.

According to one embodiment of the present invention, when the input parameter includes the time-varying parameter, the time-varying parameter may include a first random number generated by the access device and a second random number generated by the UE. To enable the access device and the UE to have the same input parameter for generating the same KeNB*, the access device needs to send the first random number to the UE, for example, by using the security mode command message, and the UE needs to send the second random number to the base station, for example, by using the setup completion message used to indicate that the radio link is successfully set up on the second air interface. Generation of the KeNB* by using the random numbers separately generated by the access device and the UE has higher security than generation of the KeNB* by using only the random number generated by the access device or the UE.

According to one embodiment of the present invention, when the input parameter includes the parameter related to the serving cell of the access device, the parameter related to the serving cell of the access device may include at least one of the following items: a cell identifier of the serving cell of the access device and a central frequency of the serving cell of the access device. Use of relevant parameters of different cells helps ensure that the derivderived KeNB* is different for different cells.

According to the method for generating an access stratum key in this embodiment of the present invention, the user equipment and the access device may use the same input parameter and the KeNB to generate the same root key KeNB*, so that the same access stratum key on the second air interface may be derivderived based on the KeNB*. Therefore, when the access stratum key is used for data transmission over the second air interface, security of data transmission over the second air interface may be improved and security of data transmitted between the access device and the user equipment is ensured.

Figure 10:
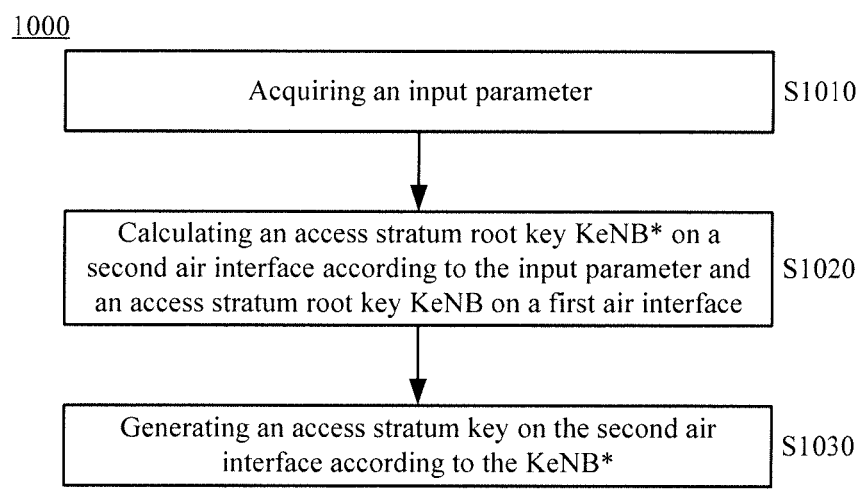
FIG. 10 is a flowchart of another method for generating an access stratum key performed by a user equipment according to an embodiment of the present invention.

As shown in FIG. 10, the method 1000 includes:

in S1010, acquiring an input parameter, where the input parameter includes a time-varying parameter and/or a parameter related to a serving cell of the access device;

in S1020, calculating an access stratum root key KeNB* on the second air interface according to the input parameter and an access stratum root key KeNB on the first air interface, where the KeNB* is also calculated by the access device according to the input parameter and the KeNB received from the base station; and in S1030, generating an access stratum key on the second air interface according to the KeNB*, where the access stratum key on the second air interface is also generated by the access device according to the KeNB*.

The method 1000 is performed by the user equipment. The user equipment may generate the access stratum root key KeNB* on the second air interface by using the acquired input parameter and the KeNB known by itself. The access device may also generate the same KeNB* by using the acquired input parameter and the KeNB received from the base station. In this way, both the user equipment and the access device may have the same root key KeNB* and may derivderive the same access stratum key on the second air interface by using the KeNB*, thereby enhancing security of data transmission over the second air interface.

According to one embodiment of the present invention, when the input parameter includes the time-varying parameter, the time-varying parameter may include a random number generated by the access device. In this case, the UE needs to receive the random number generated by the access device from the access device. For example, the UE may receive a security mode command message from the access device, where the security mode command message carries the random number generated by the access device. In this way, carrying the random number in the security mode command message may prevent an increase in network overhead due to use of a new message to transmit the random number and ensure that transmission of the random number does not affect an existing message sending sequence. The UE and the access device may generate the same KeNB* by using the same input parameter and the KeNB, thereby derivderiving the same access stratum key.

According to one embodiment of the present invention, when the input parameter includes the time-varying parameter, the time-varying parameter may include a random number generated by the UE. In this case, the UE needs to send the random number to the access device so that the access device may generate the same KeNB* as the UE. For example, the UE may send a setup completion message used to indicate that a radio link is successfully set up on the second air interface to the access device, where the setup completion message carries the random number generated by the UE. In this way, carrying the random number in the setup completion message may prevent an increase in network overhead due to use of a new message to transmit the random number and ensure that transmission of the random number does not affect the existing message sending sequence.

According to one embodiment of the present invention, when the input parameter includes the time-varying parameter, the time-varying parameter may include a first random number generated by the access device and a second random number generated by the UE. To enable the access device and the UE to have the same input parameter for generating the same KeNB*, the access device needs to send the first random number to the UE, for example, by using the security mode command message, and the UE needs to send the second random number to the access device, for example, by using the setup completion message used to indicate that the radio link is successfully set up on the second air interface. Generation of the KeNB* by using the random numbers separately generated by the access device and the UE has higher security than generation of the KeNB* by using only the random number generated by the access device or the UE.

According to one embodiment of the present invention, when the input parameter includes the parameter related to the serving cell of the access device, the parameter related to the serving cell of the access device may include at least one of the following items: a cell identifier of the serving cell of the access device and a central frequency of the serving cell of the access device. Use of relevant parameters of different cells helps ensure that the derivderived KeNB* is different for different cells.

According to the method for generating an access stratum key in this embodiment of the present invention, the user equipment and the access device may use the same input parameter and the KeNB to generate the same root key KeNB*, so that the same access stratum key on the second air interface may be derivderived based on the KeNB*. Therefore, when the access stratum key is used for data transmission over the second air interface, security of data transmission over the second air interface may be improved and security of data transmitted between the access device and the user equipment is ensured.

The following describes specific implementation of the method 800 to the method 1000 with reference to a specific example. A third example is merely used to help understand the technical solutions provided by the present invention and does not pose any limitation on the protection scope of the present invention. The third example is also implemented in the LTE-Hi architecture illustrated in FIG. 4, and the LTE-Hi AP 1 is also called an LTE-Hi node.

Third Example

Figure 11:
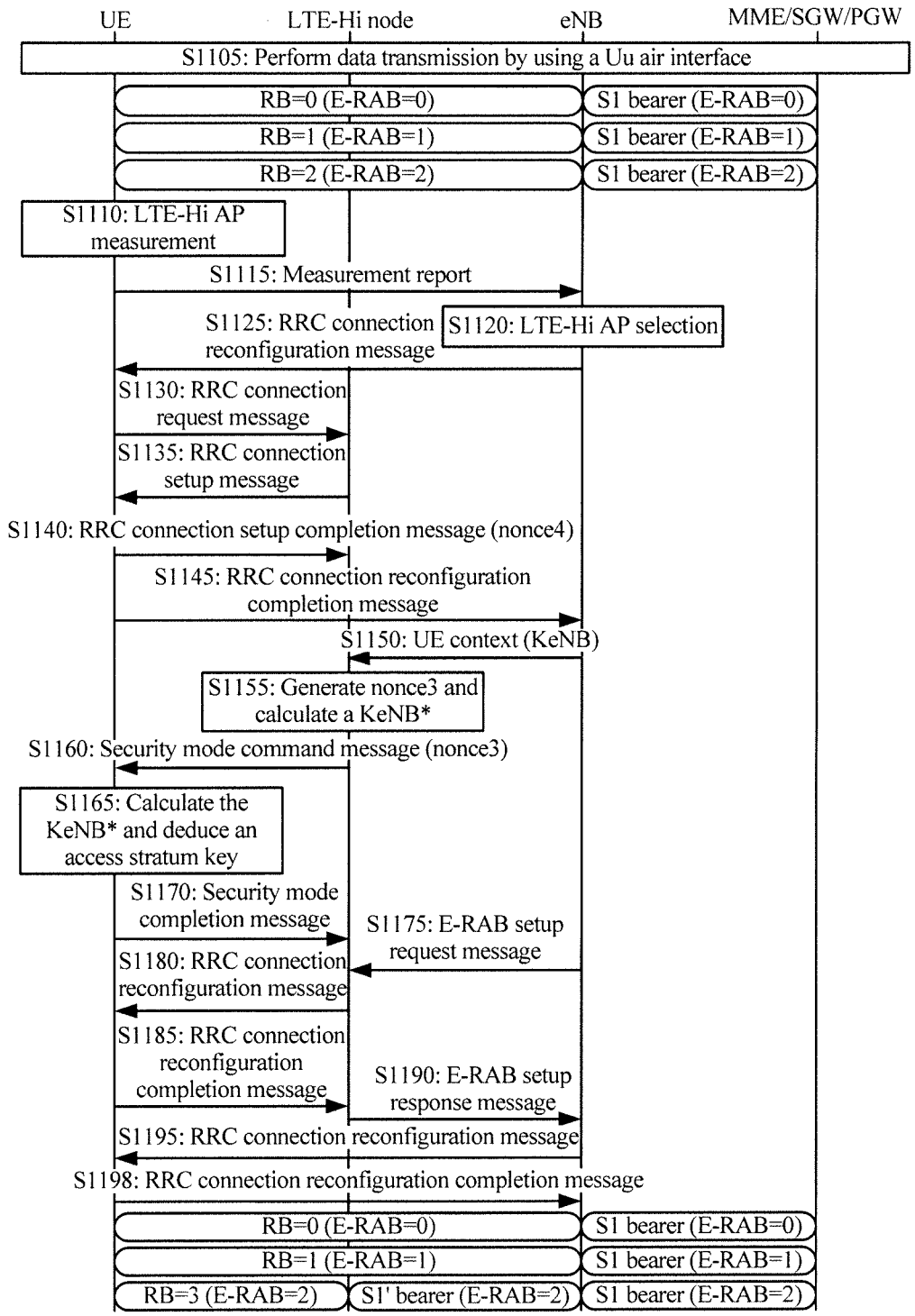
FIG. 11 is a third example of generating an access stratum key between a UE and an LTE-Hi AP in an LTE-Hi architecture.

A difference between the third example illustrated in FIG. 11 and the second example mainly lies in a KeNB* calculation entity. A KeNB* is calculated by the LTE-Hi node and a UE in the third example but is calculated by an eNB and the UE in the second example.

In the third example, the LTE-Hi node and the UE may derivderive an access stratum root key KeNB* on a Uu' air interface according to the following expression:

$$KeNB*=KDF(KeNB,PCI,DL\ EARFCN,nonce3,nonce4)$$

where, the KDF is a key generation function; the KeNB is an access stratum root key on a Uu air interface; the PCI is a cell identifier of an LTE-Hi cell covered by the LTE-Hi node; the DL EARFCN indicates a central frequency of the LTE-Hi cell; the nonce3 is a random number randomly generated by the LTE-Hi node; the nonce4 is a random number randomly generated by the UE. It should be noted that, although both the nonce3 and the nonce4 are used in the foregoing KeNB* derivation manner, the nonce3 or the nonce4 may be used independently as long as the random number is used when the KeNB* is derived. When both the nonce3 and the nonce4 are used to derive the KeNB*, better security may be provided and key values derived at different time are different. Moreover, the nonce3 and the nonce4 have an anti-replay function. In addition, this expression is merely an example and does not pose any limitation on how to acquire the KeNB*. For example, the LTE-Hi node may use only the PCI or the DL EARFCN or may use neither of them when deriving the KeNB*. When only one Hi cell is available under the LTE-Hi node, the PCI and the DL EARFCN may not be used.

In S1105, the UE performs data transmission with the eNB by using the Uu air interface, and data communicated between the UE and a core network, a packet network or the like is forwarded between the eNB and an MME/SGW/PGW.

As shown in FIG. 11, three data channels are set up between the UE and the MME/SGW/PGW, that is, E-RAB=0, E-RAB=1 and E-RAB=2. E-RAB=0 includes RB=0 between the UE and the eNB and an S1 bearer between the eNB and the MME/SGW/PGW; E-RAB=1 includes RB=1 between the UE and the eNB and the S1 bearer between the eNB and the MME/SGW/PGW; E-RAB=2 includes RB=2 between the UE and the eNB and the S1 bearer between the eNB and the MME/SGW/PGW.

In S1110, the UE performs LTE-Hi AP measurement.

In S1115, the UE sends a measurement report to the eNB, where the measurement report includes a CGI list found by the UE for LTE-Hi APs.

In S1120, the eNB selects, according to the measurement report, an LTE-Hi AP from LTE-Hi APs reported by the UE to serve the eNB. In this example, assume that the eNB selects the LTE-Hi AP 1 in the architecture illustrated in FIG. 4, which is called the LTE-Hi node for short.

In S1125, the eNB sends an RRC connection reconfiguration message to the UE, where the message carries a CGI of the LTE-Hi AP selected by the eNB.

In S1130, the UE sends an RRC connection request message to the LTE-Hi node.

In S1135, the LTE-Hi node sends an RRC connection setup message to the UE.

In S1140, the LTE-Hi node sends an RRC connection setup completion message to the UE, where the message carries the random number nonce4 generated by the UE.

In S1145, the UE sends an RRC connection reconfiguration completion message to the eNB, where the message carries a C-RNTI allocated by the LTE-Hi node.

In S1150, the eNB sends a UE context to the LTE-Hi node, where the UE context includes the KeNB and a UE security capability.

In S1155, the LTE-Hi node generates the random number nonce3, calculates the KeNB* according to the received nonce4 and the randomly generated nonce3, and calculates an access stratum key according to the KeNB*.

In S1160, the LTE-Hi node sends a security mode command to the UE, where the command carries the nonce3.

In S1165, the UE calculates the KeNB* according to the nonce4 and the nonce3, and calculates the access stratum root key according to the KeNB*.

In S1170, the UE returns a security mode completion message to the LTE-Hi node. After that, ciphering and integrity protection are performed on all RRC messages transmitted between the UE and the LTE-Hi node, by using Krrcint and Krrcenc derived from the KeNB*, and/or ciphering protection is performed for all user plane data by using Kupenc derived from the KeNB*.

In S1175, the eNB sends an E-RAB setup request message to the LTE-Hi node, where the message carries an E-RAB list to be set and the C-RNTI of the UE. Assume that E-RAB=2 is to be set.

In S1180, the LTE-Hi node sends the RRC connection reconfiguration message to the UE, where the message carries E-RAB=2 and RB=3.

In S1185, the UE returns the RRC connection reconfiguration completion message to the LTE-Hi node.

In S1190, the LTE-Hi node returns an E-RAB setup response message to the eNB, where the message carries an E-RAB setup list including RB=3.

In S1195, the eNB sends the RRC connection reconfiguration message to the UE, requesting the UE to release RB=2.

In S1198, the UE returns the RRC connection reconfiguration completion message to the eNB.

In this way, the three data channels E-RAB=0, E-RAB=1 and E-RAB=2 are set up between the UE and the MME/SGW/PGW upon configuration of a Hi branch by the eNB. E-RAB=0 and E-RAB=1 are the same as initial E-RAB=0 and E-RAB=1. E-RAB=2 after reconfiguration includes RB=3 between the UE and the LTE-Hi node, an S1' bearer between the LTE-Hi node and the eNB, and the S1 bearer between the eNB and the MME/SGW/PGW.

Although the nonce3 and the nonce4 are sent by using the security mode command message and the RRC connection setup completion message respectively in the third example, the nonce3 and the nonce4 may also be sent to a peer end by using other messages. In addition, a method for deriving an integrity protection key and a cipher key of RRC signaling and a cipher key of user plane data is the same as a method for deriving an LTE AS key.

Figure 12:
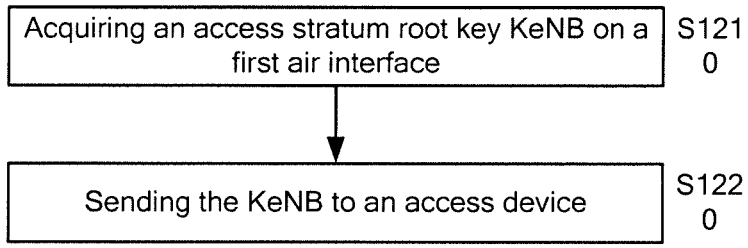
FIG. 12 is a flowchart of still another method for generating an access stratum key performed by a base station according to an embodiment of the present invention.

The following describes still another method 1200 for generating an access stratum key in a communications system according to an embodiment of the present invention with reference to FIG. 12. In the communications system, a UE accesses a core network via a base station by using a first air interface and connects to the base station via an access device by using a second air interface to access the core network. Therefore, the communications system that the method 1200 applies to is a system supporting data offloading transmission, and the UE may connect to the base station by using the two air interfaces at the same time. Such a communications system may include but is not limited to: an LTE-Hi architecture, an LTE-WiFi architecture, a WCDMA-WiFi architecture, and the like.

As shown in FIG. 12, the method 1200 includes:

in S1210, acquiring an access stratum root key KeNB on the first air interface; and in S1220, sending the KeNB to the access device so that the access device generates an access stratum key on the second air interface according to the KeNB, where the access stratum key on the second air interface is also generated by the UE according to the KeNB.

The method 1200 is performed by the base station. According to the prior art, the base station and the UE save the KeNB on the first air interface. In this embodiment of the present invention, the KeNB is directly used as the access stratum root key KeNB* on the second air interface. In this way, after receiving the KeNB from the base station, the access device, together with the UE, may use the KeNB as the access stratum root key on the second air interface and derive the access stratum key on the second air interface by using the KeNB, thereby introducing the access stratum key used for secure transmission over the second air interface.

During derivation of the access stratum key, the access device and the UE may use a preset derivation algorithm The access device and the UE may generate the same access stratum key when they have the same root key and derivation algorithm, thereby helping implement secure data transmission.

According to the method for generating an access stratum key in this embodiment of the present invention, the access device and the UE use the KeNB as the access stratum root key KeNB* on the second air interface and may derive the same access stratum key on the second air interface together. Therefore, when the access stratum key is used for data transmission over the second air interface, security of data transmission over the second air interface may be improved and security of data transmitted between the access device and the user equipment is ensured. In addition, directly using the KeNB as the KeNB* features simple implementation and low complexity.

FIG. 12 describes the method 1200 for generating an access stratum key on a base station side. The following describes a method 1300 for generating an access stratum key on an access device side according to an embodiment of the present invention with reference to FIG. 13 and a method 1400 for generating an access stratum key on a UE side according to an embodiment of the present invention with reference to FIG. 14. Both the method 1300 and the method 1400 correspond to the method 1200. Therefore, for specific descriptions of the method 1300 and the method 1400, reference may be made to the corresponding parts of the method 1200, and details are not described herein again to avoid repetition. Both the method 1300 and the method 1400 apply to the following communications system: a UE accesses a core network via a base station by using a first air interface and connects to the base station via an access device by using a second air interface to access the core network.

Figure 13:
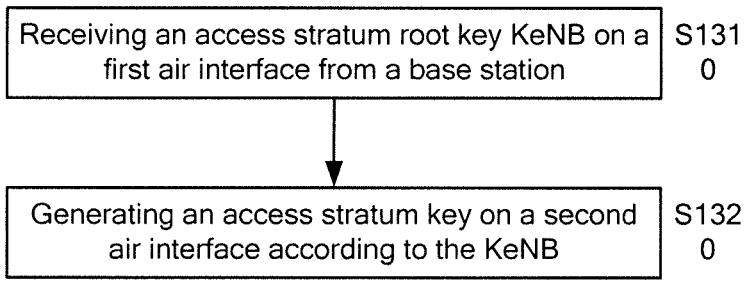
FIG. 13 is a flowchart of still another method for generating an access stratum key performed by an access device according to an embodiment of the present invention.

As shown in FIG. 13, the method 1300 includes:

in S1310, receiving an access stratum root key KeNB on the first air interface from the base station; and in S1320, generating an access stratum key on the second air interface according to the KeNB, where the access stratum key on the second air interface is also generated by the UE according to the KeNB.

The method 1300 is performed by the access device. By acquiring the KeNB from the base station, the access device, together with the UE, may use the KeNB as an access stratum root key on the second air interface and derive, according to the KeNB, the same access stratum key used on the second air interface. This introduces a key used for secure transmission over the second air interface and solves a problem in the prior art where security of transmission over the second air interface cannot be ensured.

According to the method for generating an access stratum key in this embodiment of the present invention, the access device and the UE use the KeNB as the access stratum root key on the second air interface and may derive the same access stratum key on the second air interface together. Therefore, when the access stratum key is used for data transmission over the second air interface, security of data transmission over the second air interface may be improved and security of data transmitted between the access device and the user equipment is ensured. In addition, directly using the KeNB as the KeNB* features simple implementation and low complexity.

Figure 14:
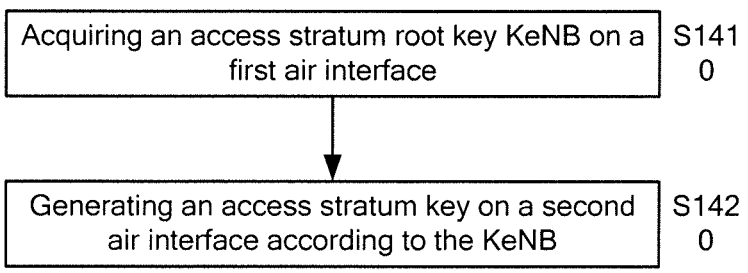
FIG. 14 is a flowchart of still another method for generating an access stratum key performed by a user equipment according to an embodiment of the present invention.

As shown in FIG. 14, the method 1400 includes:

in S1410, acquiring an access stratum root key KeNB on the first air interface; and in S1420, generating an access stratum key on the second air interface according to the KeNB, where the access stratum key on the second air interface is also generated by the access device according to the KeNB received from the base station.

The method 1400 is performed by the user equipment. The user equipment and the access device use the KeNB as an access stratum root key on the second air interface and may derive the same access stratum key on the second air interface together. Therefore, when the access stratum key is used for data transmission over the second air interface, security of data transmission over the second air interface may be improved and security of data transmitted between the access device and the user equipment is ensured. In addition, directly using the KeNB as the KeNB* features simple implementation and low complexity.

The following describes specific implementation of the method 1200 to the method 1400 with reference to a specific example. A fourth example is merely used to help understand the technical solutions provided by the present invention and does not pose any limitation on the protection scope of the present invention. The fourth example is also implemented in the LTE-Hi architecture illustrated in FIG. 4, and the LTE-Hi AP 1 is also called an LTE-Hi node.

Fourth Example

In this example, an access stratum root key KeNB* on a Uu' air interface is the same as an access stratum root key KeNB on a Uu air interface. In this way, an eNB sends a UE context including the KeNB to the LTE-Hi node, so that the LTE-Hi node acquires the KeNB and further determines the KeNB*.

The LTE-Hi node and the UE negotiate an algorithm according to the KeNB and generate an access stratum key used on the Uu' air interface. The algorithm negotiated by the LTE-Hi node and the UE may be an algorithm preset in the LTE-Hi node and the UE, an algorithm used on the Uu air interface, or an algorithm that the LTE-Hi node selects and then sends to the UE. By directly using the KeNB as the KeNB*, the LTE-Hi node and the UE may derive a cipher key and an integrity protection key used on the Uu' air interface, thereby performing secure data transmission.

The foregoing describes the methods for generating an access stratum key in a communications system according to the embodiments of the present invention. The following describes structural block diagrams of corresponding devices according to embodiments of the present invention with reference to FIG. 15 to FIG. 18. Because the devices in FIG. 15 to FIG. 18 are configured to implement the methods for generating an access stratum key according to the embodiments of the present invention, for specific operations and details of the devices, reference may be made to the descriptions in the foregoing methods.

Figure 15:
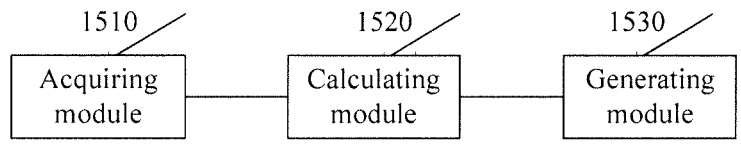
FIG. 15 is a structural block diagram of a network-side device in a communications system according to an embodiment of the present invention.
Figure 15A:
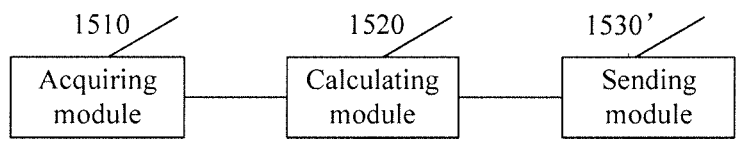
FIG. 15a is another structural block diagram of a network-side device in a communications system according to an embodiment of the present invention.

FIG. 15 and FIG. 15a are structural diagrams of a network-side device in a communications system according to embodiments of the present invention. In the communications system, a user equipment UE accesses a core network via a first network-side device by using a first air interface and connects to the first network-side device via a second network-side device by using a second air interface to access the core network. The network-side device may be the first network-side device, for example, a base station. The network-side device may also be the second network-side device, for example, an access device.

When the network-side device is the second network-side device, the network-side device includes an acquiring module 1510, a calculating module 1520, and a generating module 1530. The acquiring module 1510 may be implemented by using an input interface and/or a processor. The calculating module 1520 and the generating module 1530 may be implemented by using the processor. The acquiring module 1510 is configured to acquire an input parameter, where the input parameter includes a time-varying parameter and/or a parameter related to a serving cell of the second network-side device. The calculating module 1520 is configured to calculate an access stratum root key KeNB* on the second air interface according to the input parameter acquired by the acquiring module 1510 and an access stratum root key KeNB on the first air interface, or use the KeNB as the access stratum root key KeNB* on the second air interface. The generating module 1530 is configured to generate an access stratum key on the second air interface according to the KeNB* calculated by the calculating module 1520.

For the forgoing and other operations and/or functions of the acquiring module 1510, the calculating module 1520, and the generating module 1530, reference may be made to the corresponding descriptions in the methods 200, 900 and 1300 and the first to fourth examples, and details are not described herein again to avoid repetition.

As shown in FIG. 15a, when the network-side device is the first network-side device, the network-side device includes the acquiring module 1510, the calculating module 1520, and a sending module 1530'. The acquiring module 1510 may be implemented by using the input interface and/or the processor. The calculating module 1520 may be implemented by using the processor. The sending module 1530' may be implemented by using an output interface.

When the network-side device is the first network-side device, the acquiring module 1510 is configured to acquire the input parameter, where the input parameter includes the time-varying parameter and/or the parameter related to the serving cell of the second network-side device. The calculating module 1520 is configured to calculate the access stratum root key KeNB* on the second air interface according to the input parameter and the access stratum root key KeNB on the first air interface, or use the KeNB as the access stratum root key KeNB* on the second air interface. The sending module 1530' is configured to send the KeNB* calculated by the calculating module 1520 to the second network-side device, so that the second network-side device generates the access stratum key on the second air interface according to the KeNB*.

For the forgoing and other operations and/or functions of the acquiring module 1510, the calculating module 1520, and the sending module 1530', reference may be made to the corresponding descriptions in the methods 100, 800 and 1200 and the first to fourth examples, and details are not described herein again to avoid repetition.

According to the network-side device in the communications system in the embodiments of the present invention, the access device and the UE may further derive the access stratum key on the second air interface by acquiring the same root key KeNB*, thereby introducing the access stratum key on the second air interface to help perform secure transmission. Therefore, when the access stratum key is used for data transmission over the second air interface, security of data transmission over the second air interface may be improved and security of data transmitted between the access device and the user equipment is ensured.

Figure 16:
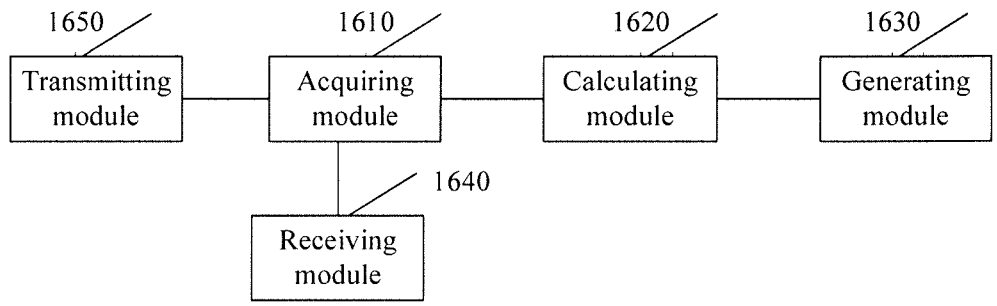
FIG. 16 is another structural block diagram of a network-side device in a communications system according to an embodiment of the present invention.
Figure 16A:
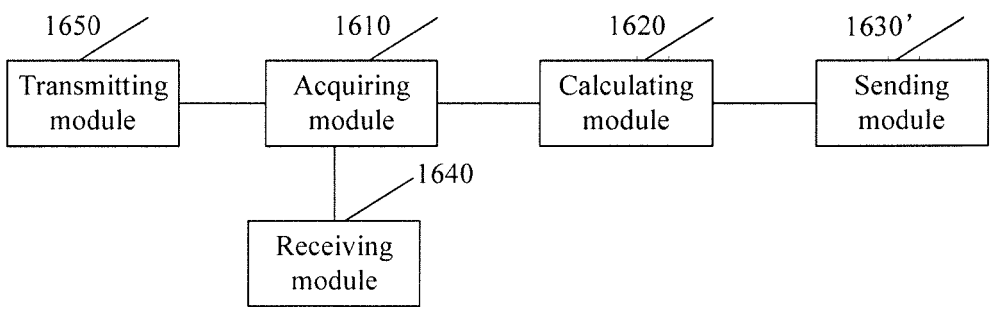
FIG. 16a is another structural block diagram of a network-side device in a communications system according to an embodiment of the present invention.

FIG. 16 and FIG. 16a are structural block diagrams of a network-side device in a communications system according to embodiments of the present invention. In the communications system, a user equipment UE accesses a core network via a first network-side device by using a first air interface and connects to the first network-side device via a second network-side device by using a second air interface to access the core network. An acquiring module 1610, a calculating module 1620, and a generating module 1630 or a sending module 1630' of the network-side device are basically the same as an acquiring module 1510, a calculating module 1520, and a generating module 1530 or a sending module 1530' of a network-side device. As mentioned above, the network-side device includes either the generating module 1630 or the sending module 1630'. When the network-side device is the second network-side device, the network-side device includes the generating module 1630. When the network-side device is the first network-side device, the network-side device includes the sending module 1630'.

According to one embodiment of the present invention, if the network-side device is the second network-side device, the network-side device further includes a receiving module 1640 that is configured to receive a KeNB from the first network-side device.

According to one embodiment of the present invention, a time-varying parameter acquired by the acquiring module 1610 may include a PDCP COUNT value of a bearer of the UE on the first air interface. For example, the PDCP COUNT value acquired by the acquiring module 1610 may correspond to a configuration message, where the configuration message is a configuration message used for configuring the second air interface for the network-side device. In this way, when the network-side device is a base station, the base station and the UE may conveniently acquire the time-varying parameter by specifying the PDCP COUNT value of a bearer on the base station and the UE instead of by exchanging a message, which may save network resources.

According to one embodiment of the present invention, the time-varying parameter acquired by the acquiring module 1610 may include a random number generated by the network-side device and/or a random number generated by the UE. In this case, the acquiring module 1610 is specifically configured to acquire the random number generated by the network-side device and/or the random number generated by the UE. The network-side device needs to further include a transmitting module 1650 that is configured to send the random number generated by the network-side device to the UE or receive the random number generated by the UE from the UE.

According to one embodiment of the present invention, the transmitting module 1650 may be specifically configured to send the configuration message used for configuring the second air interface to the UE, where the configuration message carries the random number generated by the network-side device. In this way, carrying the random number in the configuration message may prevent an increase in network overhead due to use of a new message to transmit the random number and ensure that transmission of the random number does not affect an existing message sending sequence.

According to one embodiment of the present invention, the acquiring module 1610 may be specifically configured to receive a setup completion message used to indicate that a radio link is successfully set up on the second air interface from the UE, where the setup completion message carries the random number generated by the UE. In another embodiment, the acquiring module 1610 may be configured to receive a configuration completion message in response to the configuration message used for configuring the second air interface from the UE, where the configuration completion message carries the random number generated by the UE. In this way, carrying the random number in the setup completion message or in the configuration completion message may prevent an increase in network overhead due to use of a new message to transmit the random number and ensure that transmission of the random number does not affect the existing message sending sequence.

In a case that the time-varying parameter includes both a first random number generated by the network-side device and a second random number generated by the UE, when the network-side device is the base station, to enable the base station and the UE to have the same input parameter for generating the same KeNB*, the base station needs to send the first random number to the UE, for example, by using the configuration message used for configuring the second air interface, and the UE needs to send the second random number to the base station, for example, by using the configuration completion message in response to the configuration message. Generation of the KeNB* by using the random numbers separately generated by the base station and the UE has higher security than generation of the KeNB* by using only the random number generated by the base station or the UE. When the network-side device is an access device, to enable the access device and the UE to have the same input parameter for generating the same KeNB*, the access device needs to send the first random number to the UE, for example, by using a security mode command message, and the UE needs to send the second random number to the access device, for example, by using the setup completion message used to indicate that the radio link is successfully set up on the second air interface. Generation of the KeNB* by using the random numbers separately generated by the access device and the UE has higher security than generation of the KeNB* by using only the random number generated by the access device or the UE.

According to one embodiment of the present invention, the parameter related to the serving cell of the second network-side device may include at least one of the following items: a cell identifier of the serving cell of the second network-side device and a central frequency of the serving cell of the second network-side device. Use of relevant parameters of different cells helps ensure that the derived KeNB* is different for different cells.

For the forgoing and other operations and/or functions of the receiving module 1640 and the transmitting module 1650, reference may be made to the corresponding descriptions in the methods 100, 200, 800, 900, 1200 and 1300 and the first to fourth examples, and details are not described herein again to avoid repetition.

According to the network-side device in the communications system in the embodiments of the present invention, a key used for secure transmission may be introduced for the second air interface by using the same KeNB* to derive an access stratum root key on the second air interface. Therefore, when the access stratum key is used for data transmission over the second air interface, security of data transmission over the second air interface may be improved and security of data transmitted between the access device and the user equipment is ensured.

Figure 17:
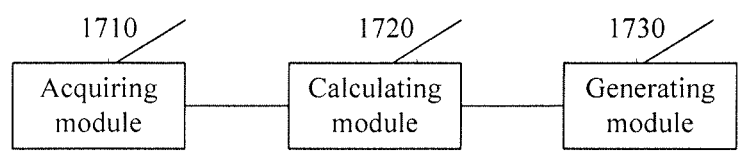
FIG. 17 is a structural block diagram of a user equipment in a communications system according to an embodiment of the present invention.

FIG. 17 is a structural block diagram of a user equipment in a communications system according to an embodiment of the present invention. In the communications system, the user equipment accesses a core network via a first network-side device by using a first air interface and connects to the first network-side device via a second network-side device by using a second air interface to access the core network.

The user equipment includes an acquiring module 1710, a calculating module 1720, and a generating module 1730. The acquiring module 1710 may be implemented by using a processor and/or an input interface. The calculating module 1720 and the generating module 1730 may be implemented by using the processor. The acquiring module 1710 is configured to acquire an input parameter, where the input parameter includes a time-varying parameter and/or a parameter related to a serving cell of the second network-side device. The calculating module 1720 is configured to calculate an access stratum root key KeNB* on the second air interface according to the input parameter acquired by the acquiring module 1710 and an access stratum root key KeNB on the first air interface, or use the KeNB as the access stratum root key KeNB* on the second air interface. The generating module 1730 is configured to generate an access stratum key on the second air interface according to the KeNB* calculated by the calculating module 1720.

For the forgoing and other operations and/or functions of the acquiring module 1710, the calculating module 1720, and the generating module 1730, reference may be made to the corresponding descriptions in the methods 300, 1000 and 1400 and the first to fourth examples, and details are not described herein again to avoid repetition.

According to the user equipment in the communications system in this embodiment of the present invention, the user equipment and an access device may acquire the KeNB-based root key KeNB*, thereby deriving the same access stratum key on the second air interface based on the KeNB*. Therefore, when the access stratum key is used for data transmission over the second air interface, security of data transmission over the second air interface may be improved and security of data transmitted between the access device and the user equipment is ensured.

Figure 18:
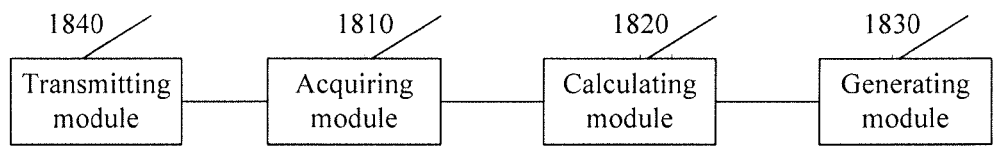
FIG. 18 is another structural block diagram of a user equipment in a communications system according to an embodiment of the present invention.

FIG. 18 is a structural block diagram of a user equipment in a communications system according to an embodiment of the present invention. In the communications system, the user equipment accesses a core network via a first network-side device by using a first air interface and connects to the first network-side device via a second network-side device by using a second air interface to access the core network. An acquiring module 1810, a calculating module 1820, and a generating module 1830 of the user equipment are basically the same as an acquiring module 1710, a calculating module 1720, and a generating module 1730 of a user equipment.

According to one embodiment of the present invention, a time-varying parameter acquired by the acquiring module 1810 may include a random number generated by a network-side device and/or a random number generated by the UE. In this case, the acquiring module 1810 is specifically configured to acquire the random number generated by the network-side device and/or the random number generated by the UE. The user equipment further includes a transmitting module 1840. The transmitting module 1840 is configured to send the random number that is generated by the UE and acquired by the acquiring module 1810 to the network-side device or receive the random number generated by the network-side device. For example, the acquiring module 1810 may be specifically configured to receive a security mode command message from the access device, where the security mode command message carries the random number generated by the access device. In this way, carrying the random number in the security mode command message may prevent an increase in network overhead due to use of a new message to transmit the random number and ensure that transmission of the random number does not affect an existing message sending sequence. For another example, the transmitting module 1840 may be specifically configured to send a setup completion message used to indicate that a radio link is successfully set up on the second air interface to the access device, where the setup completion message carries the random number generated by the UE. In this way, carrying the random number in the setup completion message may prevent an increase in network overhead due to use of a new message to transmit the random number and ensure that transmission of the random number does not affect the existing message sending sequence. For still another example, the transmitting module 1840 may be specifically configured to receive a configuration message that is sent by the network-side device to the UE and used for configuring the second air interface, where the configuration message carries the random number generated by the network-side device. This may also prevent an increase in network overhead due to use of a new message to transmit the random number and does not affect the existing message sending sequence.

In a case that the time-varying parameter includes both a first random number generated by the network-side device and a second random number generated by the user equipment, when the network-side device is the access device, to enable the access device and the user equipment to have the same input parameter for generating the same KeNB*, the access device needs to send the first random number to the user equipment, for example, by using the security mode command message, and the user equipment needs to send the second random number to the access device, for example, by using the setup completion message used to indicate that the radio link is successfully set up on the second air interface. Generation of the KeNB* by using the random numbers separately generated by the access device and the user equipment has higher security than generation of the KeNB* by using only the random number generated by the access device or the user equipment. When the network-side device is a base station, to enable the base station and the user equipment to have the same input parameter for generating the same KeNB*, the base station needs to send the first random number to the user equipment, for example, by using the configuration message used for configuring the second air interface, and the user equipment needs to send the second random number to the base station, for example, by using a configuration completion message in response to the configuration message. Generation of the KeNB* by using the random numbers separately generated by the base station and the user equipment has higher security than generation of the KeNB* by using only the random number generated by the base station or the user equipment.

According to one embodiment of the present invention, a parameter related to a serving cell of the second network-side device may include at least one of the following items: a cell identifier of the serving cell of the second network-side device and a central frequency of the serving cell of the second network-side device. Use of relevant parameters of different cells helps ensure that the derived KeNB* is different for different cells.

For the forgoing and other operations and/or functions of the acquiring module 1810 and the transmitting module 1840, reference may be made to the corresponding descriptions in the methods 300, 1000 and 1400 and the first to fourth examples, and details are not described herein again to avoid repetition.

According to the user equipment in the communications system in the embodiments of the present invention, the user equipment and the access device may use the same root key KeNB* to derive the same access stratum key on the second air interface. Therefore, when the access stratum key is used for data transmission over the second air interface, security of data transmission over the second air interface may be improved and security of data transmitted between the access device and the user equipment is ensured. In addition, directly using a KeNB as the KeNB* features simple implementation and low complexity.

A person skilled in the art may be aware that, method steps and units described in the embodiments disclosed in this specification may be implemented by electronic hardware, computer software, or a combination thereof. To clearly describe the interchangeability of hardware and software, the foregoing has generally described steps and compositions of each embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The method steps described in the embodiments disclosed in this specification may be implemented by hardware, a software program executed by a processor, or a combination thereof. The software program may be stored in a random access memory (RAM), a memory, a read-only memory (ROM), an electrically programmable ROM, an electrically erasable programmable ROM, a register, a hard disk, a removable disk, a CD-ROM, or a storage medium of any other form known in the technical field.

Although some embodiments of the present invention have been described, a person skilled in the art should understand that all modifications made without departing from the spirit and principle of the present invention shall fall within the protection scope of the present invention.

What is claimed is:

1. A method for generating an access stratum key in a communications system, wherein a user equipment (UE) is connected to a first network-side device and to a second network-side device through a first air interface and a second air interface separately, only the first network-side device connects to a control plane entity of a core network (CN), the second network-side device connects to the first network-side device via a non-ideal backhaul, and the method comprises:
    acquiring, by the first network-side device, an input parameter, wherein the input parameter is a new parameter each time it is used;
    receiving, by the first network-side device, configuration information generated by the second network-side device;
    generating, by the first network-side device, radio resource connection (RRC) reconfiguration information, wherein the RRC reconfiguration information comprises the configuration information;
    sending, by the first network-side device, the RRC reconfiguration information to the UE, wherein the RRC reconfiguration information carries the input parameter;
    calculating, by the first network-side device, an access stratum root key KeNB* for the second air interface according to the input parameter and an access stratum root key KeNB on the first air interface; and
    sending, by the first network-side device, the KeNB* to the second network-side device.

2. The method according to claim 1, wherein the input parameter comprises a value of a counter.

3. The method according to claim 2, wherein the input parameter comprises a Packet Data Convergence Protocol count (PDCP COUNT) value of a bearer of the UE on the first air interface.

4. The method according to claim 3, wherein the PDCP COUNT value corresponds to a configuration message and the configuration message is a configuration message used for the first network-side device to configure the second air interface.

5. A method for generating an access stratum key in a communications system, wherein a user equipment (UE) is connected to a first network-side device and to a second network-side device through a first air interface and a second air interface separately, only the first network-side device connects to a control plane entity of a core network (CN), the second network-side device connects to the first network-side device via a non-ideal backhaul, and the method comprises:
    acquiring, by the UE, an input parameter, wherein the input parameter is a new parameter each time it is used;
    sending, by the UE, configuration information generated by the second network-side device;
    receiving, by the UE, RRC reconfiguration information from the first network-side device, wherein the RRC reconfiguration information comprises the configuration information, and the RRC reconfiguration information carries the input parameter;
    calculating, by the UE, an access stratum root key KeNB* on the second air interface according to the input parameter and an access stratum root key KeNB on the first air interface; and
    generating, by the UE, an access stratum key on the second air interface according to the KeNB*.

6. The method according to claim 5, wherein the input parameter comprises a value of a counter.

7. The method according to claim 5, wherein:
    the input parameter comprises a random number generated by the first network-side device and/or a random number generated by the UE;
    the acquiring, by the UE, an input parameter comprises:
    acquiring, by the UE, the random number generated by the first network-side device and/or the random number generated by the UE; and
    after the acquiring, by the UE, an input parameter, the method further comprises:
    sending, by the UE, the random number generated by the UE to the first network-side device, or receiving the random number generated by the network-side network-side device.

8. The method according to claim 7, wherein the sending, by the UE, the random number generated by the UE to the first network-side device comprises:
    sending, by the UE, a setup completion message used to indicate that a radio link is successfully set up on the second air interface to the second network-side device, wherein the setup completion message carries the random number generated by the UE.

9. The method according to claim 7, wherein the receiving the random number generated by the first network-side device comprises:
    receiving a configuration message that is sent by the first network-side device to the UE and used for configuring the second air interface, wherein the configuration message carries the random number generated by the first network-side device.

10. A network-side device in a communications system, wherein a a user equipment (UE) is connected to the network-side device and to a second network-side device through a first air interface and a second air interface separately, only the network-side device connects to a control plane entity of a core network (CN), the second network-side device is connects to the network-side device via non-ideal backhaul, and the device comprises:
    a processor, configured to acquire an input parameter, wherein the input parameter is a new parameter each time it is used;
    a receiver, configured to receive configuration information generated by the second network-side device;
    the processor, configured to generate radio resource connection (RRC) reconfiguration information, wherein the RRC reconfiguration information comprises the configuration information generated by the second network-side device;

a transmitter, configured to send the RRC reconfiguration information to the UE, wherein the RRC reconfiguration information carries the input parameter;

the processor, configured to calculate an access stratum root key KeNB* on the second air interface according to the input parameter and an access stratum root key KeNB on the first air interface; and the transmitter, configured to send the KeNB* calculated by the processor to the second network-side device.

11. The network-side device according to claim 10, wherein the input parameter acquired by the processor comprises a value of a counter.

12. The network-side device according to claim 11, wherein the input parameter acquired by the processor comprises a Packet Data Convergence Protocol count (PDCP COUNT) value of a bearer of the UE on the first air interface.

13. The network-side device according to claim 12, wherein the PDCP COUNT value acquired by the processor corresponds to a configuration message and the configuration message is a configuration message used for the network-side device to configure the second air interface.

14. A user equipment in a communications system, wherein the user equipment (UE) is connected to a first network-side device and to a second network-side device through a first air interface and a second air interface separately, only the first network-side device connects to a control plane entity of a core network (CN), the second network-side device connects to the first network-side device via a non-ideal backhaul and the user equipment comprises:

a processor, configured to acquire an input parameter, wherein the input parameter is a new parameter each time it is used;

a transmitter, configured to send configuration information generated by the second network-side device;

a receiver, configured to receive RRC reconfiguration information from the first network-side device, wherein the RRC reconfiguration information comprises the configuration information generated by the second network-side device, and the RRC reconfiguration information carries the input parameter;

the processor, configured to calculate an access stratum root key KeNB* on the second air interface according to the input parameter and an access stratum root key KeNB on the first air interface; and the processor, configured to generate an access stratum key on the second air interface according to the KeNB*.

15. The user equipment according to claim 14, wherein the input parameter acquired by the processor comprises a value of a counter.

16. The user equipment according to claim 14, wherein the input parameter acquired by the processor comprises a random number generated by the first network-side device and/or a random number generated by the UE;

the processor is specifically configured to:
acquire the random number generated by the first network-side device and/or the random number generated by the UE; and the transmitter is configured to send the random number that is generated by the processor to the first network-side device, or receive the random number generated by the first network-side device.

17. The user equipment according to claim 16, wherein:
the transmitter is specifically configured to send a setup completion message used to indicate that a radio link is successfully set up on the second air interface to the second network-side device, wherein the setup completion message carries the random number generated by the UE.

18. The user equipment according to claim 16, wherein the receiver is configured to receive a configuration message that is sent by the first network-side device to the UE and used for configuring the second air interface, wherein the configuration message carries the random number generated by the first network-side device.

19. A non-transitory computer readable medium storing program codes for use by a network-side device for generating an access stratum key in a communications system, wherein a user equipment (UE) is connected to a first network-side device and to a second network-side device through a first air interface and a second air interface separately, only the first network-side device connects to a control plane entity of a core network (CN), the second network-side device connects to the first network-side device via a non-ideal backhaul, wherein the program codes comprise instructions to configure the network-side device for:

acquiring an input parameter, wherein the input parameter is a new parameter each time it is used;

receiving configuration information generated by the second network-side device;

generating a radio resource connection (RRC) reconfiguration information, wherein the RRC reconfiguration information comprises the configuration information generated by the second network-side device;

sending the RRC reconfiguration information to the UE, wherein the RRC reconfiguration information carries the input parameter;

calculating an access stratum root key KeNB* for the second air interface according to the input parameter and an access stratum root key KeNB on the first air interface; and sending the KeNB* to the second network-side device.

20. A non-transitory computer readable medium storing program codes for use by a user equipment (UE) for generating an access stratum key in a communications system, wherein a user equipment (UE) is connected to a first network-side device and to a second network-side device through a first air interface and a second air interface separately, only the first network-side device connects to a control plane entity of a core network (CN), the second network-side device connects to the first network-side device via a non-ideal backhaul, wherein the program codes comprise instructions to configure the UE for:

acquiring an input parameter, wherein the input parameter is a new parameter each time it is used;

sending configuration information generated by the second network-side device;

receiving RRC reconfiguration information from the first network-side device, wherein the RRC reconfiguration information comprises the configuration information generated by the second network-side device, and the RRC reconfiguration information carries the input parameter;

calculating an access stratum root key KeNB* on the second air interface according to the input parameter and an access stratum root key KeNB on the first air interface; and generating an access stratum key on the second air interface according to the KeNB*.

\* \* \* \* \*

UNITED STATES PATENT AND TRADEMARK OFFICE
CERTIFICATE OF CORRECTION

PATENT NO. : 10,009,326 B2
APPLICATION NO. : 15/644196
DATED : June 26, 2018
INVENTOR(S) : Dongmei Zhang et al.

It is certified that error appears in the above-identified patent and that said Letters Patent is hereby corrected as shown below:

In the Claims

Column 28, Line 51:
In Claim 10, delete "a a" and insert -- a --, therefore.

Signed and Sealed this
Ninth Day of October, 2018

Andrei Iancu
*Director of the United States Patent and Trademark Office*